United States Patent
Khalil et al.

(10) Patent No.: US 9,871,793 B2
(45) Date of Patent: *Jan. 16, 2018

(54) DIAMETER SIGNALING FOR MOBILE IPV4

(71) Applicant: Apple Inc., Cupertino, CA (US)

(72) Inventors: Mohamed Khalil, Murphy, TX (US); Ahmad Muhanna, Richardson, TX (US); Haseeb Akhtar, Garland, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,644

(22) Filed: Jan. 31, 2017

(65) Prior Publication Data

US 2017/0155649 A1    Jun. 1, 2017

Related U.S. Application Data

(63) Continuation of application No. 14/659,727, filed on Mar. 17, 2015, now Pat. No. 9,578,029, which is a
(Continued)

(51) Int. Cl.
*H04L 29/06* (2006.01)
*H04L 29/12* (2006.01)
(Continued)

(52) U.S. Cl.
CPC ...... *H04L 63/0892* (2013.01); *H04L 61/2007* (2013.01); *H04L 69/03* (2013.01);
(Continued)

(58) Field of Classification Search
CPC . H04L 63/0892; H04L 61/2007; H04L 69/03; H04L 63/164; H04W 12/06;
(Continued)

(56) References Cited

U.S. PATENT DOCUMENTS 6,542,992 B1    4/2003  Peirce, Jr. et al.
6,738,362 B1    5/2004  Xu et al.
(Continued)

FOREIGN PATENT DOCUMENTS

CN    1960301    5/2007
EP    1380150    1/2004

OTHER PUBLICATIONS

Calhoun, P. et al., "Diameter Mobile IPv4 Application", RFC 4004, Aug. 2005, pp. 1-53.*
(Continued)

*Primary Examiner* — Michael Pyzocha
(74) *Attorney, Agent, or Firm* — Meyertons, Hood, Kivlin, Kowert & Goetzel, P.C.

(57) ABSTRACT

The invention consists of a new registration and authentication protocol for between a Mobile Node and a Home Agent. The new protocol uses a novel messaging sequence to request registration, authentication and authorization of the Mobile Node when it is located on a foreign network, and the novel protocol will avoid some of the standard registration and authentication protocol messages in order to eliminate the problems associated with re-transmission errors.

20 Claims, 2 Drawing Sheets

Related U.S. Application Data continuation of application No. 14/205,499, filed on Mar. 12, 2014, now Pat. No. 9,009,789, which is a continuation of application No. 12/671,985, filed as application No. PCT/US2008/009646 on Aug. 12, 2008, now Pat. No. 8,713,637.

(60) Provisional application No. 60/956,550, filed on Aug. 17, 2007, provisional application No. 60/955,533, filed on Aug. 13, 2007.

(51) Int. Cl.
| | |
|---|---|
| *H04W 12/08* | (2009.01) |
| *H04W 12/06* | (2009.01) |
| *H04W 8/04* | (2009.01) |
| *H04W 8/06* | (2009.01) |
| *H04W 60/00* | (2009.01) |
| *H04W 80/04* | (2009.01) |

(52) U.S. Cl.
CPC ............... *H04W 8/04* (2013.01); *H04W 8/06* (2013.01); *H04W 12/06* (2013.01); *H04W 12/08* (2013.01); *H04W 60/00* (2013.01); *H04L 63/164* (2013.01); *H04W 80/04* (2013.01)

(58) Field of Classification Search
CPC ....... H04W 12/08; H04W 60/00; H04W 8/04; H04W 8/06; H04W 80/04
See application file for complete search history.

(56) References Cited

U.S. PATENT DOCUMENTS

| | | | |
|---|---|---|---|
| 7,152,238 B1 | 12/2006 | Leung et al. | |
| 7,382,748 B1* | 6/2008 | Bharatia | H04W 8/065 370/328 |
| 7,421,077 B2* | 9/2008 | Leung | H04L 63/08 380/247 |
| 7,639,802 B2 | 12/2009 | Gundavelli et al. | |
| 7,646,753 B2 | 1/2010 | Islam et al. | |
| 7,840,811 B2* | 11/2010 | Nah | H04W 12/04 713/171 |
| 8,891,506 B2 | 11/2014 | Strater | |
| 2002/0018456 A1 | 2/2002 | Kakemizu et al. | |
| 2002/0065785 A1* | 5/2002 | Tsuda | G06Q 20/3674 705/67 |
| 2003/0091013 A1 | 5/2003 | Song et al. | |
| 2004/0133682 A1 | 7/2004 | De Vriendt et al. | |
| 2005/0041808 A1* | 2/2005 | He | H04L 63/0272 380/248 |
| 2006/0001829 A1 | 1/2006 | McGregor | |
| 2006/0067271 A1* | 3/2006 | Chen | H04L 63/0272 370/331 |
| 2006/0073840 A1 | 4/2006 | Akgun et al. | |
| 2006/0140196 A1 | 6/2006 | Tanaka et al. | |
| 2007/0008900 A1* | 1/2007 | Shousterman | H04W 88/182 370/252 |
| 2007/0107047 A1* | 5/2007 | Mukherjee | H04L 63/08 726/4 |
| 2007/0208864 A1* | 9/2007 | Flynn | H04L 63/02 709/227 |
| 2008/0109877 A1 | 5/2008 | Park et al. | |
| 2008/0219224 A1 | 9/2008 | Balaji et al. | |
| 2009/0185691 A1 | 7/2009 | Falk et al. | |

OTHER PUBLICATIONS

Notice of Allowance from Korean Patent Application No. 10-2014-7019112, dated Feb. 25, 2015, English and Korean versions, pp. 1-7.
"MIPv4 Authentication Performance Using RADIUS and Diameter MIPv4", A. Muhanna, Jun. 28, 2007, pp. 1-16.
Office Action for European Patent Application No. 08795251.1, Jul. 29, 2016, 4 pages.
Chinese Office Action, Application No. 201310749450.6, dated Mar. 2, 2016, 20 pages.
Chinese Office Action, Application No. 201310749447.4, dated Apr. 12, 2016, 18 pages.
Chinese Office Action, Application No. 201310749414.X, dated Apr. 12, 2016, 18 pages.

* cited by examiner

DIAMETER SIGNALING FOR MOBILE IPV4

CROSS-REFERENCE TO RELATED APPLICATIONS

This application is a continuation of United States patent application Ser No. 14/659,727, filed Mar. 17, 2015, entitled "New Diameter Signaling for Mobile IPV4", which is a continuation of U.S. patent application Ser No. 14/205,499, filed Mar. 12, 2014, of the same title (now U.S. Pat. No. 9,009,789), which is a continuation of U.S. patent application Ser No. 12/671,985, filed Feb. 3, 2010, of the same title (now U.S. Pat. No. 8,713,637), which is a National Stage Entry of PCT/US2008/009646, filed Aug. 12, 2008, which claims priority under 35 U.S.C. §119(e) to U.S. Provisional Patent Application Ser. Nos. 60/955,533 filed on Aug. 13, 2007 and 60/956,550 filed on Aug. 17, 2007, each of which are hereby incorporated by reference.

TECHNICAL FIELD OF THE INVENTION

A system and method for a mobile IP-based system, including an IP-based mobile communication system having a home network, foreign network and a mobile node.

BACKGROUND OF THE INVENTION

IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will always be associated with a single home network for IP addressing purposes. The home network has a Home Agent and the foreign network has a Foreign Agent—both of which control the routing of information packets into and out of their network.

The Mobile Node, Home Agent and Foreign Agent may be called other names depending on the nomenclature used on any particular network configuration or communication system. For instance, a "Mobile Node" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like.

And, a home agent may be referred to as a Home Agent, Home Mobility Manager, Home Location Register, and a foreign agent may be referred to as a Foreign Agent, Serving Mobility Manager, Visited Location Register, and Visiting Serving Entity. The terms Mobile Node, Home Agent and Foreign Agent are not meant to be restrictively defined, but could include other mobile communication units or supervisory routing devices located on the home or foreign networks. Foreign networks can also be called serving networks.

Registering the Mobile Node

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile Nodes examine the agent advertisement and determine whether they are connected to the home network or a foreign network.

If the Mobile Node is located on its home network, information packets will be routed to the Mobile Node according to the standard addressing and routing scheme. If the Mobile Node is visiting a foreign network, however, the Mobile Node obtains appropriate information from the agent advertisement, and transmits a registration request message to its Home Agent through the Foreign Agent. The registration request message will include a care-of address for the Mobile Node. A registration reply message may be sent to the Mobile Node by the Home Agent to confirm that the registration process has been successfully completed.

The Mobile Node keeps the Home Agent informed as to its current location by registering a "care-of address" with the Home Agent. The registered care-of address identifies the foreign network where the Mobile Node is located, and the Home Agent uses this registered care-of address to forward information packets to the foreign network for subsequent transfer onto the Mobile Node. If the Home Agent receives an information packet addressed to the Mobile Node while the Mobile Node is located on a foreign network, the Home Agent will transmit the information packet to the Mobile Node's current location on the foreign network using the applicable care-of address.

Authentication, Authorization and Accounting ("AAA")

In an IP-based mobile communications system, when a mobile node travels outside its home administrative domain, the mobile node may need to communicate through multiple domains in order to maintain network connectivity with its home network. While connected to a foreign network controlled by another administrative domain, network servers must authenticate, authorize and collect accounting information for services rendered to the mobile node. This authentication, authorization, and accounting activity is called "AAA", and AAA servers on the home and foreign network perform the AAA activities for each network.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server will also provide the accounting function including tracking usage and charges for use of transmissions links between administrative domains.

Another function for the AAA server is to support secured transmission of information packets by storing and allocating security associations. Security associations refer to those encryption protocols, nonces, and keys required to specify and support encrypting an information packet transmission between two nodes in a secure format. The security associations are a collection of security contexts existing between the nodes that can be applied to the information packets exchanged between them. Each context indicates an authentication algorithm and mode, a shared or secret key or appropriate public/private key pair, and a style of replay protection.

The current registration and authentication protocols are not efficient because they require the re-transmission of registration and authentication request messages in certain time-out situations. The re-transmission of the registration and authentication request messages may be unnecessary in these situations, and such a re-transmission of these messages may result in multiple request messages being transmitted onto the network when only one request message was needed.

SUMMARY OF THE INVENTION

The invention consists of a new registration and authentication protocol for between a Mobile Node and a Home Agent. The new protocol will use a novel messaging sequence to request registration, authentication and authorization of the Mobile Node when it is located on a foreign network, and the novel protocol will avoid some of the standard registration and authentication protocol messages in order to eliminate the problems associated with re-transmission errors.

The initial sequence of messaging in the protocol will be conducted between the Mobile Node, Foreign Agent, foreign AAA server and home network AAA server, before a registration request is allowed to be sent to the Home Agent. The initial registration request message is transmitted to the Home Agent only after the successful completion of the initial message sequence between the other components on the network.

The home agent will exchange messages with its home agent AAA server to confirm authentication and authorization on the home network, and if successful, the home agent will respond to the registration request with a response that is sent back to the Mobile Node on the foreign network. The invention can be implemented using a new protocol application or using modified messages from prior registration applications.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
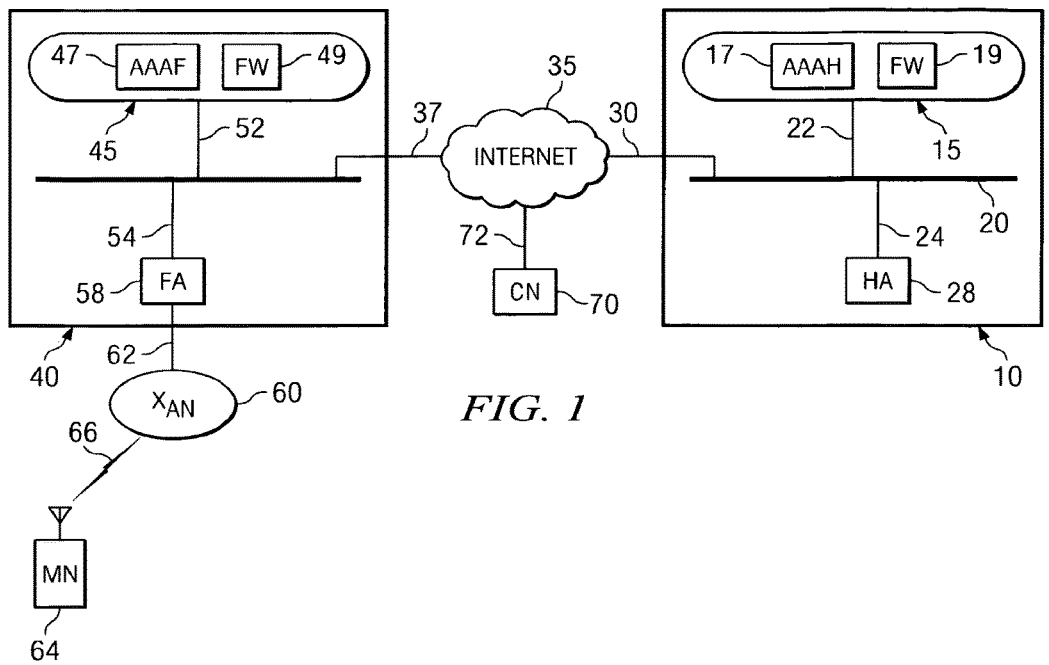
FIG. 1 is a mobile IP-based communication system as used in the present invention.

In FIG. 1, the overall architecture of the IP-based mobile system is shown with a Mobile Node 64, a home network 10 and a foreign network 40. As shown in FIG. 1, the home network 10 and the foreign network 40 are coupled to the Internet represented by the cloud 35. The home network 10 has a central buss line 20 coupled to the Home Agent 28 via communication link 24. The buss line 20 is coupled to the AAA server 17 via communication link 22. The home network 10 is coupled to the Internet 35 via communication link 30. A communications link is any connection between two or more nodes on a network or users on networks or administrative domains.

The foreign network 40 has a central buss line 50 coupled to the foreign agent 58 via communication link 54. The buss line 50 is coupled to the AAA foreign network server 47 via communication link 52. The foreign network 40 is coupled to the Internet 35 via communication link 37. Mobile Node 64 is shown electronically coupled to the foreign network 40 via the wireless communication link 66 of transceiver 60. Transceiver 60 is coupled to the foreign network 40 via communication link 62. The Mobile Node 64 can communicate with any transceiver or Access Network coupled to the foreign network 40.

The terms Home Agent and Foreign Agent may be as defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network 10 having the responsibility to manage mobility-related functionality for a Mobile Node 64. Likewise, the term Foreign Agent, as used in this application, can refer to a Serving Mobility Manager, Visited Location Register, Visiting Serving Entity, or any other agent on a foreign network 40 having the responsibility to manage mobility-related functionality for a Mobile Node 64.

In the mobile IP communications system shown in FIG. 1, the Mobile Node 64 is identified by a permanent IP address. While the Mobile Node 64 is coupled to its home network 10, the Mobile Node 64 receives information packets like any other fixed node on the home network 10. When mobile, the Mobile Node 64 can also locate itself on foreign network 40. When located on foreign network 40, the home network 10 sends data communications to the Mobile Node 64 by "tunneling" the communications to the foreign network 40.

The Mobile Node 64 keeps the Home Agent 28 informed of its current location, or foreign network association, by registering a care-of address with the Home Agent 28. Essentially, the care-of address represents the foreign network 40 where the Mobile Node 64 is currently located. If the Home Agent 28 receives an information packet addressed to the Mobile Node 64 while the Mobile Node 64 is located on a foreign network 40, the Home Agent 28 will "tunnel" the information packet to foreign network 40 for subsequent transmission to Mobile Node 64.

The Foreign Agent 58 participates in informing the Home Agent 28 of the Mobile Node's 64 current care-of address. The Foreign Agent 58 also receives information packets for the Mobile Node 64 after the information packets have been forwarded to the Foreign Agent 58 by the Home Agent 28. Moreover, the Foreign Agent 58 serves as a default router for out-going information packets generated by the Mobile Node 64 while connected to the foreign network 40.

The Mobile Node 64 participates in informing the Home Agent 28 of its current care-of address. When the Mobile Node 64 is visiting a foreign network 40, the Mobile Node 64 obtains appropriate information regarding the address of the foreign network 40 and/or the Foreign Agent 58 from an agent advertisement. After obtaining this information, the Mobile Node 64 transmits the registration request to the Foreign Agent 58, which prepares the registration request message for forwarding to the Home Agent 28.

Mobile IP protocols require that the mobile node register the care-of address with the Home Agent 28 on the home network 10 after movement to a new foreign network 40. As part of the registration process, the Mobile Node 64 issues a registration request in response to power-up on the foreign network 40 or receipt of an agent advertisement. A registration request message can be sent to the home network 10 that includes a care-of address for the Mobile Node 64. A registration reply is issued by the home network 10 to acknowledge receipt of the registration request, confirm receipt of the care-of address for the Mobile Node 64, and indicate completion of the registration process.

The care-of address identifies the foreign network 40 where the Mobile Node 64 is located, and the Home Agent 28 uses this care-of address to tunnel information packets to the foreign network 40 for subsequent transfer to the Mobile Node 64. After registration is completed, the Home Agent 28 receives this communication and "tunnels" the message to the Mobile Node 64 on the foreign network 40. The Foreign Agent 58 accepts the re-directed communication and delivers the information packet to the Mobile Node 64 through the transceiver 60. In this manner, the information packets addressed to the Mobile Node 64 at its usual address on the home network 10 is re-directed or forwarded to the Mobile Node 64 on the foreign network 40. The Foreign Agent 58 may also serve as a router for "outbound" information packets generated by the Mobile Node 64 while connected to the foreign network 40 depending on the delivery style chosen.

Figure 2:
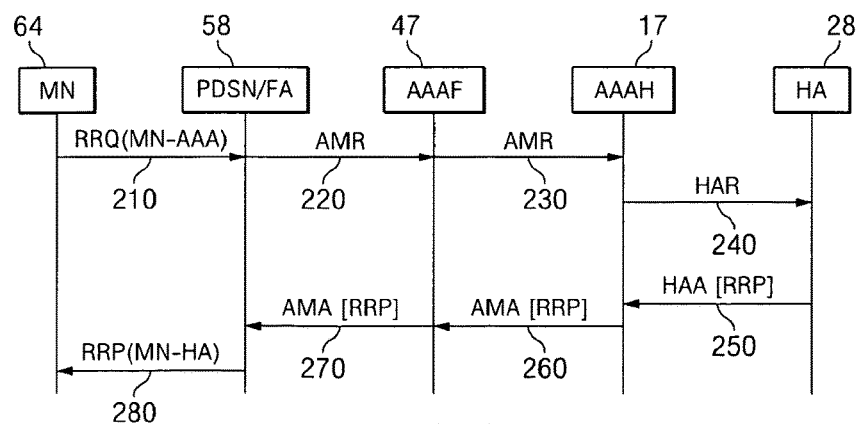
FIG. 2 is a message sequence for registration and authentication protocol used in the prior art.

FIG. 2 shows the message sequence using a known protocol (RF 4004) for the registration and authentication of the Mobile Node 64 on a foreign network. In step 210, the registration request RRQ is transmitted from the Mobile Node 64 to the Foreign Agent 58. The registration request RRQ message is received and a new registration message AMR is formed by the Foreign Agent 58, and, at step 220, that message is transmitted from the Foreign Agent 58 to the AAAF server 47 on the foreign network. The AMR message is transmitted from the AAAF server 47 to the AAAH server 17 at step 230, where a new registration request message HAR is generated and transmitted from the AAAH 17 to the Home Agent 28 at step 240.

The Home Agent 28 analyzes this HAR message before responding to that message with a registration response message HAA, which is transmitted back to the AAAH server 17 at step 250. The AAAH server 17 forms a new registration response message AMA at the AAAH server 17 and transmits that new registration response message AMA to the AAAF server 47 at step 260. The AAAF server 47 forwards the registration response message AMA to the Foreign Agent 58 at step 270, where a new registration response message RRP is formed. The Foreign Agent 58 transmits the new registration response message RRP to the Mobile Node 64 at step 280.

This known protocol uses three different registration messages and three different registration response messages, all transmitted sequentially in eight steps between five components. Delays may occur at any stage in the protocol sequence, and if the registration request or registration response messages are delayed to a substantial degree, the Mobile Node 64 may re-issue its registration request under the assumption that the prior registration request was lost or failed transmission. This re-issue and re-transmission of the registration request may be unnecessary, and could cloud the networks with registration messages that should not otherwise have been issued and transmitted. The present invention eliminates the possibility for such problems by simplifying the request and response message sequence for registration and authentication.

Figure 3:
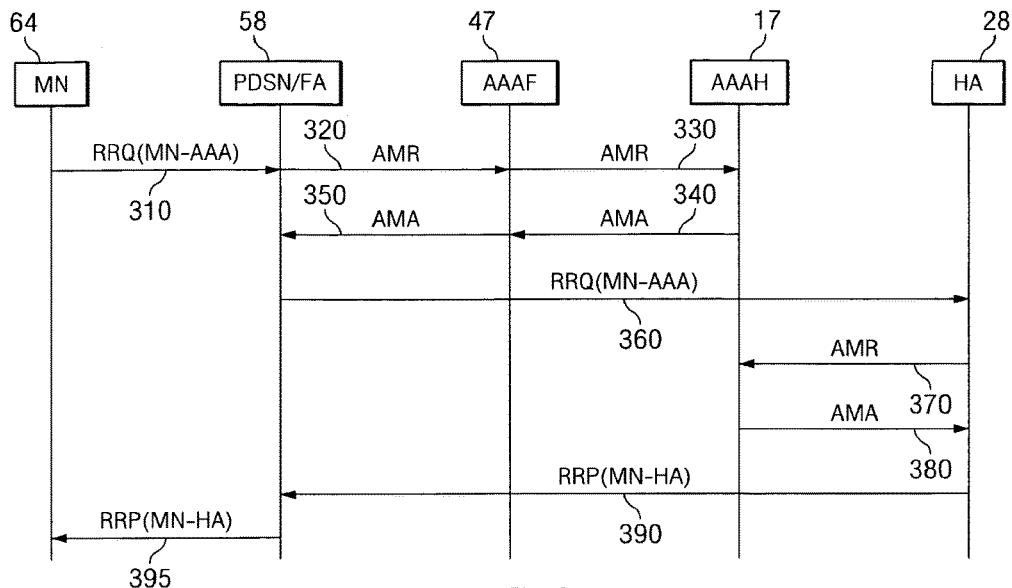
FIG. 3-4 are message sequences for the present invention.

FIG. 3 shows the message sequence using the present invention for the registration and authentication of the Mobile Node 64 on a foreign network. In step 310, the registration request RRQ is transmitted from the Mobile Node 64 to the Foreign Agent 58. The registration request RRQ message is received and a new registration message AMR is formed by the Foreign Agent 58, and the AMR message is transmitted from the Foreign Agent 58 to the AAAF server 47 on the foreign network at step 320. The AMR message is transmitted from the AAAF server 47 to the AAAH server 17 at step 330.

Instead of allowing the request messages to be communicated directly to the Home Agent, the initial message sequence first requires the AAAH 17 to analyze the request message AMR and then prepare a response message AMA that is transmitted from the AAAH 17 to AAAF 47 at step 340. The AAAF 47 transmits the response message AMA to the Foreign Agent 58 at step 350. The initial message sequence is finalized with the receipt of that AMA message at step 350.

After confirmation that the registration request has been approved and authenticated by the AAAH 17 through the AMA response message received by the Foreign Agent, the Foreign Agent forwards the registration request RRQ message initially received from the Mobile Node 64 directly to the Home Agent 28 at step 360. The Home Agent transmits an AMR request message to the AAAH 17 at step 370 based on the receipt of the request message RRQ, and the AAAH 17 responds to the AMR request message with the transmission of a registration response AMA message at step 380. With the receipt of the AMA message at step 380, the Home Agent 28 confirms the ability to register the Mobile Node 64.

After authentication and registration at the Home Agent 28, the Home Agent 28 transmits a registration response message RRP to the Foreign Agent 58 at step 390, and the Foreign Agent 58 forwards this registration response message to the Mobile Node 64 at step 395. With the receipt of the registration response message RRP by the Mobile Node 64, the registration and authentication protocol is completed. This protocol uses a reduced number of different message formats (four formats) compared to the prior art protocol, which assists in the reduction in the possibility that delays would occur and these delays would initiate re-transmissions of the registration request message.

Figure 4:
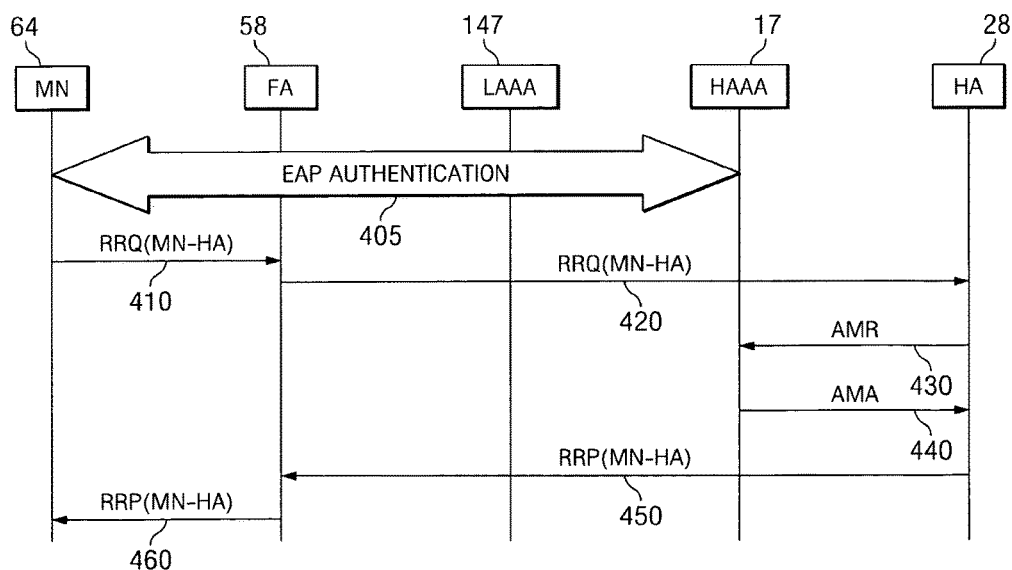

FIG. 4 shows the message sequence using the present invention for the registration and authentication of the Mobile Node 64 on a foreign network. In step 405, the initial message sequence is designated by the EAP Authentication communicated between the Mobile Node 64, Foreign Agent 58, LAAA 147 (corresponds to AAAF 47), and the HAAA 17. This EAP Authentication 405 allows the Mobile Node 64 to be authenticated by the HAAA 17 through an initial sequence of messages. Instead of allowing the request messages to be communicated directly to the Home Agent, the initial message sequence first requires the AAAH 17 to analyze the request message and confirm authentication back to components on the foreign network 40.

After step 405, the registration request RRQ is transmitted from the Mobile Node 64 to the Foreign Agent 58 at step 410. After confirmation that the registration request has been approved and authenticated by the AAAH 17 through the EAP Authentication 405, the Foreign Agent forwards the registration request RRQ message initially received from the Mobile Node 64 directly to the Home Agent 28 at step 420. The Home Agent transmits an AMR request message to the AAAH 17 at step 430 based on the receipt of the request message RRQ, and the AAAH 17 responds to the AMR request message with the transmission of a registration response AMA message at step 440. With the receipt of the AMA message at step 440, the Home Agent 28 confirms the ability to register the Mobile Node 64.

After authentication and registration at the Home Agent 28, the Home Agent 28 transmits a registration response message RRP to the Foreign Agent 58 at step 450, and the Foreign Agent 58 forwards this registration response message to the Mobile Node 64 at step 460. With the receipt of the registration response message RRP by the Mobile Node 64, the registration and authentication protocol is completed. This protocol uses a reduced number of different message formats (four formats) compared to the prior art protocol, which assists in the reduction in the possibility that delays would occur and these delays would initiate re-transmissions of the registration request message.

Having described the invention, we claim:

1. A method for registration and authentication of a mobile node of a home network on a foreign network, comprising:
    performing communication, by the mobile node on the foreign network, of at least part of an initial message sequence comprising communication between a mobile node, foreign agent of the foreign network, and one or more Authentication, Authorization and Accounting (AAA) servers;
    transmitting, by the mobile node on the foreign network after the initial message sequence, a registration request message to a home agent on the home network, wherein the registration request message is transmitted via the foreign agent on the foreign network, wherein the foreign agent is configured to forward the registration request message from the mobile node without transmission to one or more of the AAA servers to confirm authentication of the mobile node in response to the registration request message, and wherein the home agent is configured to exchange messages to confirm the authentication of the mobile node, based on receipt of the registration request message from the mobile node via the foreign agent, with at least one AAA server of the home network of the mobile node; and
    receive a registration response from the home agent via the foreign agent.

2. The method of claim 1,
wherein confirmation by the home agent of the authentication of the mobile node through the one or more AAA servers confirms a previous authentication procedure for the mobile node comprising the initial message sequence.

3. The method of claim 1,
wherein the one or more AAA servers comprise the at least one AAA server in the home network.

4. The method of claim 3,
wherein the one or more AAA servers further comprise one or more AAA servers in the foreign network.

5. The method of claim 1,
wherein the registration response message received at the mobile node completes the registration and authentication procedure.

6. The method of claim 1,
wherein the registration response message is received at the mobile node upon confirmation of the authentication of the mobile node through the one or more AAA servers by the home agent.

7. The method of claim 1,
wherein the initial message sequence corresponds to an extensible authentication protocol (EAP).

8. A method for registration and authentication of a mobile node of a home network on a foreign network, comprising:
    transmitting a registration request message to a home agent on the home network, wherein the registration request message is transmitted via a foreign agent on the foreign network, wherein the foreign agent is configured to forward the registration request message from the mobile node without transmission to one or more Authentication, Authorization and Accounting (AAA) servers to confirm authentication of the mobile node in response to the registration request message, and wherein the home agent is configured to exchange messages to confirm the authentication of the mobile node, based on receipt of the registration request message from the mobile node via the foreign agent, with at least one AAA server of the home network of the mobile node; and
    receiving a registration response from the home agent via the foreign agent.

9. The method of claim 8, further comprising:
performing, by the mobile node on the foreign network and prior to the transmitting the registration request message to the home agent on the home network, communication of at least part of an initial message sequence comprising communication between the mobile node, foreign agent of the foreign network, and the one or more AAA servers.

10. The method of claim 9,
wherein confirmation by the home agent of the authentication of the mobile node through the one or more AAA servers confirms a previous authentication procedure for the mobile node comprising the initial message sequence.

11. The method of claim 9,
wherein the initial message sequence corresponds to an extensible authentication protocol (EAP).

12. The method of claim 8,
wherein the one or more AAA servers comprise at least one AAA server in the home network.

13. The method of claim 8,
wherein the one or more AAA servers further comprise one or more AAA servers in the foreign network.

14. An apparatus, comprising:
a memory; and
a processor in communication with the memory, wherein the processor is configured to:
    generate instructions to transmit a registration request message to a home agent on a home network, wherein the registration request message is transmitted via a foreign agent on a foreign network, wherein the foreign agent is configured to forward the registration request message from a mobile node associated with the apparatus without transmission to one or more Authentication, Authorization and Accounting (AAA) servers to confirm authentication of the mobile node in response to the registration request message, and wherein the home agent is configured to exchange messages to confirm the authentication of the mobile node, based on receipt of the registration request message from the mobile node via the foreign agent, with at least one AAA server of the home network of the mobile node; and
    receive a registration response from the home agent via the foreign agent.

15. The apparatus of claim 14,
wherein the processor is further configured to:
    perform, while connected to the foreign network and prior to generating instructions to transmit the registration request message to the home agent on the home network, communication of at least part of an initial message sequence comprising communication between the mobile node, foreign agent of the foreign network, and the one or more AAA servers.

16. The apparatus of claim 15,
wherein confirmation by the home agent of the authentication of the mobile node through the one or more AAA servers confirms a previous authentication procedure for the mobile node comprising the initial message sequence.

17. The apparatus of claim 15,
wherein the initial message sequence corresponds to an extensible authentication protocol (EAP).

18. The apparatus of claim 14,
wherein the one or more AAA servers comprise at least one AAA server in the home network.

19. The apparatus of claim 14,
wherein the one or more AAA servers further comprise one or more AAA servers in the foreign network.

20. The apparatus of claim 14,
wherein the registration response message completes the registration and authentication procedure.

\* \* \* \* \*